United States Patent Office 3,489,993
Patented Jan. 13, 1970

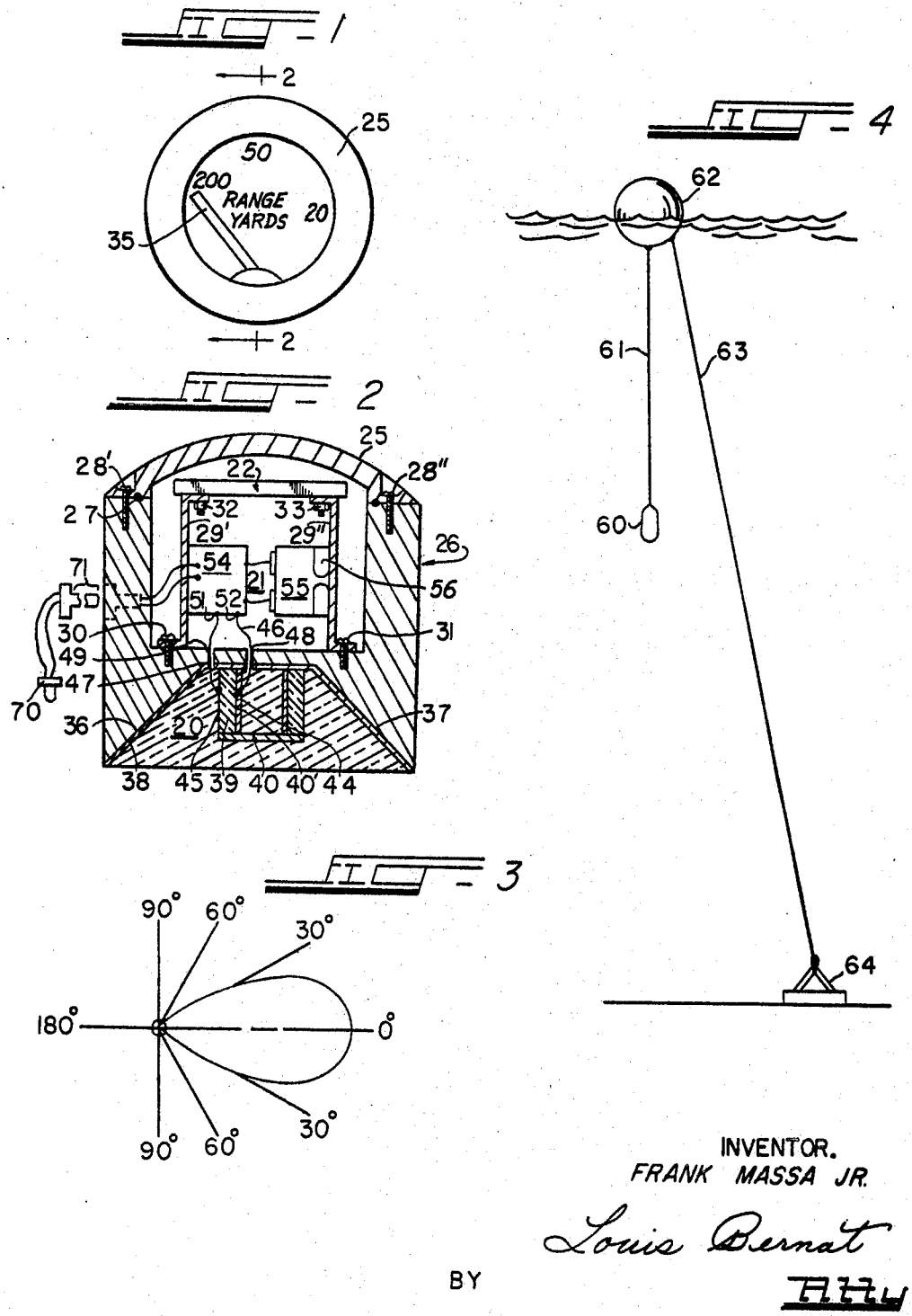

3,489,993
ULTRASONIC HOMING BEACON AND COMMUNICATION EQUIPMENT FOR UNDERWATER SWIMMERS
Frank Massa, Jr., Cohasset, Mass., assignor to Dynamics Corporation of America, Hingham, Mass.
Filed Aug. 17, 1967, Ser. No. 661,375
Int. Cl. H04b 13/02; G01v 1/00
U.S. Cl. 340—6
5 Claims

ABSTRACT OF THE DISCLOSURE

This is a homing system for guiding underwater swimmers to a moored ultrasonic beacon which sends out omnidirectional signals. The swimmer carries an ultrasonic compass comprising a compact housing that includes a directional receiving hydrophone and a signal strength indicating meter. Since the receiver is directional, the strength of the signal which it receives will, of course, be maximum when the receiver is pointing directly at the beacon. Therefore, the swimmer orients the axis of the receiver to obtain a maximum signal reading on the meter scale. Then, he swims in the direction in which the receiving hydrophone is pointing, and this takes him to the moored ultrasonic beacon.

---

This invention relates to an ultrasonic homing beacon and communication system which is particularly useful for guiding underwater swimmers, and more particularly, to systems for assisting them during conditions of poor visibility.

A primary object of my invention is to provide an ultrasonic homing beacon system especially well suited for guiding underwater swimmers. More particularly, an object is to provide a system utilizing (1) a fixed underwater transducer capable of generating omnidirectional ultrasonic signals which acts as a guiding beacon, and (2) a compact, directional, ultrasonic compass which may be carried by an underwater swimmer to enable him to move in the direction of the beacon. Here, a further object is to indicate to him the approximate distance which separates him from that beacon.

Another object of my invention is to provide a compact, highly efficient, directional, ultrasonic receiver which has maximum sensitivity along a particular axis. Here, an object is to provide such a receiver with a predetermined angle of sensitivity which is wide enough to make it easy to locate the beacon. Conversely, an object is to provide a receiver having a sensitivity which falls off rapidly for angles which are outside the predetermined angle of maximum sensitivity. A specific object of the invention is to provide an ultrasonic receiver that has directional characteristics which are relatively free of secondary lobes having any significantly high sensitivity at angles other than the desired directional axis.

A still further object of my invention is to design a directional, ultrasonic, underwater receiver having a two-piece housing structure which includes a directional hydrophone structure formed by suitably shaping the outer portion of one of the housing sections.

Yet another object of my invention is to provide an underwater system, of the described type, which includes means for transmitting warning signals to call underwater swimmers back to their beacon station.

In keeping with an aspect of the invention, these and other objects are accomplished by a homing system which operates somewhat as an underwater ultrasonic direction finder operates. For present purposes, my system may be considered a portable device which is somewhat analogous to an ultrasonic compass. The ultrasonic compass is mounted in a compact waterproof housing which may be carried in any suitable manner; for example, it may be strapped to the diver's wrist. This ultrasonic compass comprises a directional receiver in combination with a meter that indicates the strength of a received beacon signal. Thus, there is a maximum deflection when the receiving axis of the compass is aligned with the azimuth of the beacon. In order to keep the equipment small, I have found it desirable to use signals in the ultrasonic frequency region in the approximate range 40 kHz. to 80 kHz. At lower frequencies, the physical dimensions of the receiver become too large, and at higher frequencies, the attenuation loss in water becomes appreciable if the range exceeds a few hundred yards.

The novel features which are characteristic of this invention are set forth with particularity in the appended claims. However, the invention itself both as to its organization and method of operation will best be understood by reference to the following description taken in conjunction with the accompanying drawings in which:

FIG. 1 is a front view of a meter for providing one type of read-out which tells an underwater swimmer about his position with reference to a fixed beacon;

FIG. 2 is a cross-sectional view of the ultrasonic compass taken along the line 2—2 of FIG. 1;

FIG. 3 illustrates the directional response characteristics of the hydrophone receiving element contained in the ultrasonic compass of FIG. 2; and FIG. 4 illustrates a beacon suspended from a floating buoy which is anchored to the ocean floor.

Briefly, FIGS. 1 and 2 show a portable ultrasonic compass incorporating the principles of the invention. Basically, this compass has three major portions; an ultrasonic horn and transducer assembly 20, electronic equipment 21 for processing signals produced by the transducer responsive to sonic energy picked up at 20, and a device 22 for giving a read-out responsive to the output of the electronic circuit. When the swimmer points the horn and transducer assembly 20 directly at the beacon station, the read-out device 22 gives an indication of a maximum strength signal. This way, the swimmer may scan with the horn 20 while he watches the read-out device. When he observes the maximum signal indication, he swims in the direction in which the horn is pointing, and that takes him back to the beacon.

More particularly, a preferred housing structure including a semi-spherical or dome shaped end-cap 25 which mates with and completely closes the open end of another cup-shaped housing structure 26. An O-ring 27 and screws 28', 28" enable an assembly of sections 25 and 26 into a completely watertight enclosure. For the embodiment here shown, the housing portion 26 may be either a molded, rigid plastic, waterproof material or a metal casting or forging, as desired. The dome-shaped housing portion 25 may be made of a transparent material such as Lucite. Or, an alternative structure may include a composite assembly of an opaque ring portion having a pressure resistant glass window suitably bonded therein. By using a frequency of approximately 60 kHz., the entire structure can be built with an overall dimension having approximately a 3" diameter. This is a suitable and convenient size for a device used as an underwater ultrasonic compass. However, the physical size may be made somewhat larger or smaller depending upon the choice of frequency and sharpness of the receiving beam that is desired. By making the structure in approximately the shape illustrated in FIG. 2, the unit may be conveniently strapped to the wrist of an underwater swimmer. He may easily observe the meter scale while moving his arm to determine the orientation of a maximum reading, thereby making an alignment upon the homing signal from the ultrasonic beacon.

A chassis 29', 29" is attached inside a recessed area of housing portion 26 by means of a plurality of screws 30, 31. A read-out means 22, here shown as an electrical meter, is attached to the other end of the chassis 29', 29" by means of studs and nuts 32, 33. Preferably, the meter has a wide pointer 35 (FIG. 1) so that it may be seen easily when it is under water.

At its opposite end, the housing portion 26 terminates in a recessed conical frustrum cavity. Preferably, if the lines 36, 37 were extended until they meet, the angle of the sides of the conical frustrum cavity would be approximately 90°. The wall of this cavity is lined with a thin layer of low acoustic impedance material 38, such as a mixture of rubber and cork, one example of which is sold under the trade name of "Corprene."

A transducer in the form of a thin-walled polarized ceramic cylinder 39 is cemented to the "Corprene" lined surface on the bottom of the recessed cavity 20. For this cylinder, I prefer to use a polarized barium titanate or lead zirconate, both of which are well known transducer materials. The inner surface and the free-end of the cylindrical ceramic transducer element 39 are also lined with a thin layer of the low acoustic impedance material 40, 40' such as the "Corprene" mixture.

A potting compound, having approximately the acoustic impedance of water, completely fills the conical frustrum cavity 20. There are many well known potting compounds, of which the family of epoxies are typical, that satisfy the necessary requirement in that they are waterproof and provide good acoustic coupling between the ceramic element 39 and the water.

Insulated conductors 46 and 47 are used to electrically connect the electrodes 44, 45 deposited or otherwise formed on inner and outer surfaces of the ceramic cylinder to electronic equipment 54. These conductors pass through and are sealed in clearance holes 48, 49 in the base of the conical frustrum. The details of the electronic circuit 54 are not shown since they are prior art circuits and are not part of this invention. However, it is thought that any one of many conventional circuits may be employed to achieve the desired signal detection and amplification. In addition, band pass filters may also be included in order to reduce the sensitivity of the system to background noise and thereby improve the signal-to-noise ratio.

A battery 55 is schematically shown as attached to the chassis 29" by a clip 56. Any suitable electrical contacts are connected between the positive and negative terminals of the battery and the corresponding power input terminals of the electronic circuit 54. Since the output meter 22 has extremely low power requirements, the battery 55 has very low drain, therefore, it does not have to be changed except infrequently, after relatively long periods of use. The battery replacement may be easily accomplished by removing the dome-shaped closure cap 25. Alternatively, a rechargeable battery may be used.

Means are provided for indicating when a maximum strength signal is received. In greater detail, an ultrasonic amplifier is included in box 54 for increasing the strength of signals generated by the transducer 39. The amplified signals may then be rectified, applied to, and read on a D.C. milliammeter 22. Since the horn 20 is directional, the magnitude of the picked-up signals is an indication of both direction and distance to the fixed beacon. Therefore, at a maximum meter reading, the horn points at the beacon and the needle 35 points to numbers indicating the distance between the swimmer and the beacon.

The directional pattern of the receiving hydrophone is illustrated in FIG. 3. More particularly, a hydrophone which is constructed as shown in FIG. 2, has a directional receiving response which is essentially a single lobe fanning out at a predetermined angle, here shown as about 60°. The response throughout the region outside the main lobe beam angle falls off to at least 25 db below the level of sensitivity on the main axis of maximum response. The pattern is free of the usual secondary lobes that are associated with pistons and other directional elements. This means that no false bearings are obtained since the high sensitivity response lies only in the predetermined angle of the main lobe. Therefore, the maximum sensitivity of this hydrophone is, along an axis corresponding to the center line of the ceramic cylinder 39.

FIG. 4 schematically illustrates an underwater ultrasonic beacon used to provide a fixed point of reference for the underwater swimmer. More specifically, the beacon utilizes a transmitting transducer 60 suspended by a cable 61 from a buoy 62. This transmitting transducer may be enclosed within a molded rubber cover which not only protects the transducer but also furnishes a waterproof covering which is sealed to the jacket of the underwater cable 61. A line 63 attaches the buoy 62 to an anchor 64 which keeps the transmitting beacon at a fixed location. Instead of the anchor 64, the line 63 could, of course, be attached to either an anchored ship or any other fixed reference point. Also, the buoy 62 may be omitted, and the line 61 may be connected directly to a ship. The power for operating the transmitting transducer 60 may be furnished in any conventional manner. For example, the power supply could be in the buoy 62; or, it could be a portable or permanent type of shipboard electrical generator.

The transmitting transducer 60 may consist of a piezoelectric ceramic cylinder identical to the cylinder 39 illustrated in FIG. 2. In its radiation characteristics, the transducer 60 is omnidirectional in both the horizontal and vertical directions provided that the length of the ceramic transmitting transducer cylinder is not greater than about one-half of a wavelength. If the length of the ceramic cylinder is made longer, e.g. in the order of one wavelength, the response along the vertical axis of the suspended transducer is much less; however, the sound radiation continues to be omnidirectional in the horizontal plane. As an optimum, I prefer to use a ceramic cylinder which has a length that is approximately three-fourths of a wavelength. This optimum size results in an omnidirectional response for a large vertical angle throughout 360° of horizontal azimuth.

In operating the direction finder, the fixed beacon represented by the transducer 60 emits an ultrasonic signal which is transmitted outwardly in all directions. For the simple purpose of finding the direction to a moored ultrasonic underwater beacon, the transmitted beacon signal may be either a continuous signal or, preferably, a series of repetitive bursts of ultrasonic signals. The bursts should recur at a sufficiently rapid repetition rate to maintain a constant meter reading when the directional receiver is brought into alignment with the beacon. An underwater swimmer equipped with the ultrasonic compass, shown in FIG. 2, then obtains a maximum indication on the meter 22 when he aligns the receiving axis of the horn 20 with the ultrasonic beacon set out from transducer 60.

The distance between the beacon and the compass is indicated by the strength of the signal which is received. In greater detail, the intensity of the ultrasonic signal sent out from the beacon is set to a predetermined level by the design and adjustment of the equipment. The sensitivity of the ultrasonic amplifier in box 54 of the receiving hydrophone of FIG. 2 is adjusted so that the output meter 22 reads approximately a full scale at a close range of about 10 to 20 yards. At greater distances, the maximum reading of the output meter 22 decreases because the signal level attenuates as the range increases. For example, if a full scale meter reading represents a range of approximately twenty yards, the maximum meter reading obtained at approximately two-hundred yards should be about 10% of a full scale reading assuming that attenuation through the water is negligible. The reading would be somewhat less than 10% of full scale if attenuation is taken into account.

From the foregoing, it should be clear that the described system provides two items of information for the underwater swimmer. First, by rotating the directional receiver which he holds until the output meter reading becomes maximum, he receives the reltaive bearing of the beacon with respect to his position. Second, he finds his approximate distance from the beacon by the magnitude of the meter reading when it is aligned with the beacon.

Means are provided for improving the visibility of the meter reading. That is, visibility is improved by making the meter pointer 35 relatively wide, and by marking the meter scale with the approximate range in yards, without showing exact points on the scale. An approximate indication of distance is here given within an acceptable precision; however, it is recognized that a less visible pointer and scale are more accurate.

Instead of a simple meter indicator, I may also use a sonic indicator. In this case, the ultrasonic signal which is received causes electronic equipment 54 to generate a proportional audible signal that is transmitted to the swimmer in any suitable manner, as from a second transducer built into the face of the housing portion 25. Or, the second transducer may be an ear plug 70 which is connected to the electronic equipment 54 via an underwater connector 71. In this arrangement, the intensity of the audible signal is maximum when the receiver is pointed toward the moored beacon, and the relative volume of the signal is an audible indication of the distance from the moored beacon.

A third alternative embodiment used lights to give the guidance and range information to the swimmer. For example, several lights may be mounted under dome 25 in place of the meter 22. A selective number of these lights are turned on according to the relative intensity of the signal that is picked up by the receiving hydrophone. Thus, when the receiving hydrophone is in alignment with the moored beacon, the maximum signal strength is indicated because a maximum number of lights are lit for that signal strength. For example, as an indication of the high magnitude of the received signal strength, when the swimmer is at a close range, three or four lights may be illuminated at a maximum signal strength bearing. Since the magnitude of maximum signal strength is reduced at greater ranges, fewer lights are illuminated when the directional receiver is brought into alignment with the beacon. Thus, the swimmer has an approximate idea of the range when he observes the number of lights that are turned on when his receiver is pointing at the beacon.

For a more sophisticated use of the system which has been described the electronic equipment associated with the transmitting ultrasonic beacon 60 may be provided with coded signals which could be transmitted on command. By appropriate additions to the electronic circuit 54, the coded signals could be used for giving a warning signal to the swimmers. For example, this warning could be used for calling swimmers back when there is an oncoming storm.

A still further use of the system might include means for superimposing speech signals on the ultrasonic sound waves much as speech is modulated on a carrier wave in conventional telephony. In this case, a demodulator is included in the electronic circuitry 54 of FIG. 2. This arrangement yields audible signals which may be transmitted to the swimmer by means of the underwater earphone 70. If two-way conversation is desired, a microphone and modulator may also be added to the equipment 54, in which case the directional receiver shown in FIG. 2 could be used as an ultrasonic speech modulated transmitter in a manner similar to that described above for the beacon 60.

Although a few specific examples have been chosen to illustrate the basic principles of the invention, it will be obvious to those skilled in the art that numerous departures may be made from the details shown. Therefore, the invention should not be limited to the specific equipment shown and described herein. Quite the contrary, the appended claims should be construed to cover all equivalents falling within the true spirit of the invention.

I claim:

1. An ultrasonic underwater directional indicator comprising a cup-shaped housing structure having a tubular body portion open on one end and closed on the opposite end, the closed end having a recessed conical frustrum shaped cavity, lined with a layer of low acoustic impedance material, means comprising a transducer element, having a longitudinal axis, for transforming ultrasonic sound pressures reaching said transducer into corresponding electrical signals, said transducer element being mounted within said conical frustrum shaped cavity with its longitudinal axis co-linear with the normal axis of said cavity, a sound transmitting waterproof compound filling said cavity and encapsulating said transducer element, a waterproof lid having a rim portion which mates with the open end portion of said cup-shaped housing structure, watertight sealing means interposed between said lid and said open end of said housing structure whereby a watertight chamber is formed with the combination of said housing and lid assembly, and means including a meter and electrical circuit for giving a positive read-out responsive to the magnitude of the sonic signal reaching said open end.

2. The invention of claim 1 further characterized in that the ultrasonic frequency of operation lies in the approximate range 40 kHz. to 80 kHz.

3. An ultrasonic underwater directional indicator comprising a cup-shaped housing structure having a tubular body portion open on one end and closed on the opposite end, the closed end having a recessed conical frustrum shaped cavity, lined with a layer of low acoustic impedance material, means comprising a transducer element, having a longitudinal axis, for transforming ultrasonic sound pressures reaching said transducer into corresponding electrical signals, said transducer element being mounted within said conical frustrum shaped cavity with its longitudinal axis co-linear with the normal axis of said cavity, a sound transmitting waterproof compound filling said cavity and encapsulating said transducer element, a waterproof lid having a rim portion which mates with the open end portion of said cup-shaped housing structure, watertight sealing means interposed between said lid and said open end of said housing structure whereby a watertight chamber is formed with the combination of said housing and lid assembly, electronic circuit means assembled within said watertight chamber, said electronic circuit means including an ultrasonic amplifier for amplifying the electrical signals generated by said transducer element, and means comprising an output meter for indicating the magnitude of said amplified electrical singals.

4. The invention of claim 3 characterized in that said meter has a face which lies directly below said waterproof lid, and further characterized in that said lid is transparent to permit an external reading of a scale on the meter.

5. The invention of claim 4 and power supply means contained within said watertight enclosure for operating said electronic circuit means.

References Cited

UNITED STATES PATENTS

| 2,935,728 | 5/1960 | Morgan | 340—3 |
| 3,005,183 | 10/1961 | Mayes | 340—6 |
| 3,079,583 | 2/1963 | Beitscher et al. | 340—5 |
| 3,123,798 | 3/1964 | Holloway et al. | 340—3 |
| 3,262,094 | 7/1966 | Camp | 340—8 X |

RICHARD A. FARLEY, Primary Examiner

U.S. Cl. X.R.

340—8